(12) United States Patent
Bolt, Jr. et al.

(10) Patent No.: US 7,729,694 B2
(45) Date of Patent: Jun. 1, 2010

(54) SYSTEMS AND METHODS FOR FACILITATING COMMUNICATION BETWEEN TRANSCEIVERS USING DIFFERENT PROTOCOLS

(75) Inventors: Monte L. Bolt, Jr., Dunkirk, MD (US); Reena M. Parangot, Davidsonville, MD (US)

(73) Assignee: Arinc Incorporated, Annapolis, MD (US)

( * ) Notice: Subject to any disclaimer, the term of this patent is extended or adjusted under 35 U.S.C. 154(b) by 645 days.

(21) Appl. No.: 11/717,749

(22) Filed: Mar. 14, 2007

(65) Prior Publication Data

US 2008/0037453 A1  Feb. 14, 2008

Related U.S. Application Data

(60) Provisional application No. 60/836,142, filed on Aug. 8, 2006.

(51) Int. Cl.
*H04W 4/00* (2009.01)
(52) U.S. Cl. .................................. 455/426.1; 370/466
(58) Field of Classification Search .............. None
See application file for complete search history.

(56) References Cited

U.S. PATENT DOCUMENTS

| | | | | |
|---|---|---|---|---|
| 6,937,612 | B1 * | 8/2005 | Mauger et al. | 370/465 |
| 7,574,606 | B1 * | 8/2009 | Fan et al. | 713/179 |
| 2003/0156566 | A1 * | 8/2003 | Griswold et al. | 370/338 |
| 2005/0090262 | A1 * | 4/2005 | Hamano et al. | 455/445 |
| 2006/0052099 | A1 | 3/2006 | Parker | |
| 2006/0056370 | A1 * | 3/2006 | Hancock et al. | 370/338 |

\* cited by examiner

*Primary Examiner*—Ajit Patel
(74) *Attorney, Agent, or Firm*—Oliff & Berridge, PLC (57) ABSTRACT

Systems and methods are provided for communicating data content using different protocols. The systems and methods may include intercepting a transmission from a first transceiver containing a first data content, using a first protocol. The first protocol may be identified and an assessment made whether the first protocol is compatible with a second transceiver. Based on the assessment that the first protocol is not compatible with the second transceiver, data content may be converted to a second protocol. The data content may be transmitted to the second transceiver using the second protocol. The systems and methods may automatically convert the data content to the second protocol based on information associated with the first or second transceivers.

27 Claims, 4 Drawing Sheets

SYSTEMS AND METHODS FOR FACILITATING COMMUNICATION BETWEEN TRANSCEIVERS USING DIFFERENT PROTOCOLS

INCORPORATION BY REFERENCE

This application claims priority to U.S. Provisional Patent Application No. 60/836,142 entitled "Oceanic Clearance Delivery For Non Supporting Avionics" filed on Aug. 8, 2006. The disclosure of the priority application is hereby incorporated herein by reference in its entirety.

BACKGROUND

This disclosure is directed to systems and methods for facilitating communication between transceivers using different protocols.

Communication systems use differing communication protocols to structure and interpret content within a transmission. These protocols allow for rapid and verifiable transmission and reception of data including audio data. Such protocols are used in all manner of communication devices including, for example, handheld wireless communication, long-range data/voice communication, electronic or electro-optical wired communication systems, and other like systems.

As communication systems continue to evolve at an ever increasing rate, the possibility of one or more components of a communication system, or entire communication systems, becoming obsolete or incompatible with other systems with which they are intended to communicate, particularly with reference to compatible protocols used in these systems, grows.

One area in which such obsolescence or incompatibility is particularly acute is with respect to aircraft communications. As a specific example, Oceanic Clearance Delivery (OCD) involves formatted messaging provided to aircrew, via voice communication or data link communication systems, advising the air crew of clearance to fly over the North Atlantic. Included in these messages are airspeed and altitude information provided generally in a re-formatted electronic format. This electronic information is generally presented in a single protocol that is compatible with the newest aircraft avionics suites. If an aircraft does not employ the newest aircraft avionics suite, reversion must be had to conventional voice (HF radio) systems that are, in general, heavily congested and may lead to delays. It is precisely this congestion and delay concern that led to the introduction of OCD for delivering clearances in the above-described electronic data format.

The newest systems discussed above provide that aircraft use one of their onboard computers, that are able to transmit, for example, an ARINC 623 protocol/formatted (623) message containing a request for a data link received OCD, sent from the aircraft, via any one of a variety of communication means. A 623 message request is received by a host processor. The host processor validates the request and advises the aircraft through a return 623 message that the request is acknowledged and to await further information. Once the clearance is acknowledged, the host processor sends the OCD to the aircraft as a 623 message. In addition to aircraft clearance information, there are several other messages pertaining to OCD that may be passed. As technology enhances over the upcoming years, other 623 and even newer protocol messages will appear in the industry.

SUMMARY

Aircraft that do not support 623 message protocol are not able to transmit or receive 623 messages. Accordingly, these aircraft are forced to use secondary means to exchange the necessary data. The secondary means are often, as noted above, more cumbersome and congested, leading to potential clearance delivery delay and in circumstances may be less reliable and/or accurate, than newer systems.

Although the OCD scenario discussed above presents an example in which obsolescence or incompatibility of communication systems is particularly acute and actualized, like problems may be found in other areas as well. Where communication protocols are changed such that legacy equipment may not be compatible with newer protocols, or necessary modifications of existing systems are not immediately executed to all users, like communication difficulties may ensue. Thus, an environment may exist where transmissions from a given communication system are not recognized by receivers to which the transmissions are intended to be directed. Alternative means may need to be employed based on incompatibility of system transmission/reception capability. Employing the alternative means may be substantially less desirable than employing the newest communication format. Additionally, there may be users communicating via a first system that would benefit from access to a second system that is incompatible with communication devices of the first system based on, for example, an inability to resolve differences in respective data formats.

In view of the foregoing, it would be desirable to provide systems and methods whereby seamless communication between transceivers using different protocols may be conducted or enhanced.

In various exemplary embodiments, systems and methods according to this disclosure may provide enhanced communication between transceivers using different protocols.

In various exemplary embodiments, systems and methods according to this disclosure may be directed, for example, to intercepting transmissions sent in a first protocol from one transceiver. The intercepted transmissions may be assessed for whether the first protocol may be compatible with an intended recipient transceiver. Based on the assessment, elements of the transmissions may be converted to a second protocol to correspond to the reception capability of the intended recipient transceiver.

In various exemplary embodiments, systems and methods according to this disclosure may intercept a transmission containing data content and using a protocol. The protocol may be identified as a first protocol. An assessment may be made whether the first protocol is compatible with a second transceiver to which the transmission may be directed. The data content may then be converted to a second protocol, that corresponds with a reception capability of the second transceiver, based on a determination that the first protocol is not compatible with the second transceiver. The data content may then be transmitted to the second transceiver using the second protocol.

In various exemplary embodiments, an identifier of, and/or information that is associated with, a transceiver may be stored and/or accessed by the systems and methods according to this disclosure. Intercepted transmissions may then be automatically converted based on the identifier of, and/or information associated with, the transceiver.

In various exemplary embodiments, information regarding communications capabilities of a transceiver may be referenced, and conversions between various protocols may be performed automatically based on an assessment of the referenced information.

In various exemplary embodiments, the first protocol and second protocol may be at least different ones of ARINC 620 or ARINC 623 protocols. Thus, 620 protocol transmissions may be intercepted, identified and retransmitted using 623 protocol, and vice versa.

In various exemplary embodiments, the first or second transceiver may be onboard an aircraft, or may be in an air traffic control operations center. Thus, communication between otherwise incompatible avionics suites onboard aircraft and in air traffic control operations centers may be enhanced.

In various exemplary embodiments, converting data content to the second protocol in the disclosed systems and methods may include identifying specific elements of the data content that are compatible with the second protocol and converting only those elements to the second protocol. In other words, exemplary systems and methods may support selectively converting formatted information between protocols even when the data content of the respective protocols does not specifically correspond such as, for example, when one protocol contains additional information that a second protocol may not support, or in multi-band communications audio and/or other data that may not be supported by one or the other of the respective protocols.

In various exemplary embodiments, a first transceiver may be identified based on at least one of a transmission protocol, a registered transceiver identifier or a transmitted transceiver identifier.

In various exemplary embodiments, an exemplary system for enhancing communication between transceivers using different protocols may include: a signal intercepting transceiver to intercept signal transmissions from a first transceiver containing a data content using a first protocol; a protocol identifying device that identifies the first protocol and a protocol reception capability of a second transceiver; a signal converting unit that converts the data content to a second protocol based on an assessment of the identified protocol reception capability of the second transceiver; and a transmitter that transmits the data content to the second transceiver using the second protocol.

In various exemplary embodiments, an exemplary system may also include a data storage device that stores an identifier and/or information associated with at least one of the first transceiver or the second transceiver. A protocol identifying device may also identify at least one of the reception capability of the first transceiver or the second transceiver based on the associated identifier and/or information.

It should be appreciated that although this discussion is primarily focused on communication systems and protocols that may be installed in the field of aircraft control, the systems and methods according to this disclosure are not limited to such implementations. Rather, disclosed systems and methods may find application in any scenario in which an intermediate communication system may facilitate communication between communication systems and/or devices using different protocols.

These and other objects, advantages and features of the systems and methods according to this disclosure are described in, or apparent from, the following description of embodiments.

BRIEF DESCRIPTION OF THE DRAWINGS

Various exemplary embodiments of the disclosed system and methods will be described, in detail, with reference to the following figures wherein.

DETAILED DESCRIPTION OF EMBODIMENTS

The following description of various exemplary embodiments of systems and methods for facilitating communication between transceivers using different protocols may refer to and/or illustrate an Oceanic Clearance Delivery (OCD) transceiver support system, that enhances communication between an aircraft and an air traffic control center to deliver an oceanic clearance, for the sake of clarity and ease of depiction and description. However, it should be appreciated that the principles disclosed herein, as outlined and/or discussed below, can be equally applied to any known, or later-developed, system in which it would be advantageous to facilitate communication between transceivers using different protocols.

Figure 1:
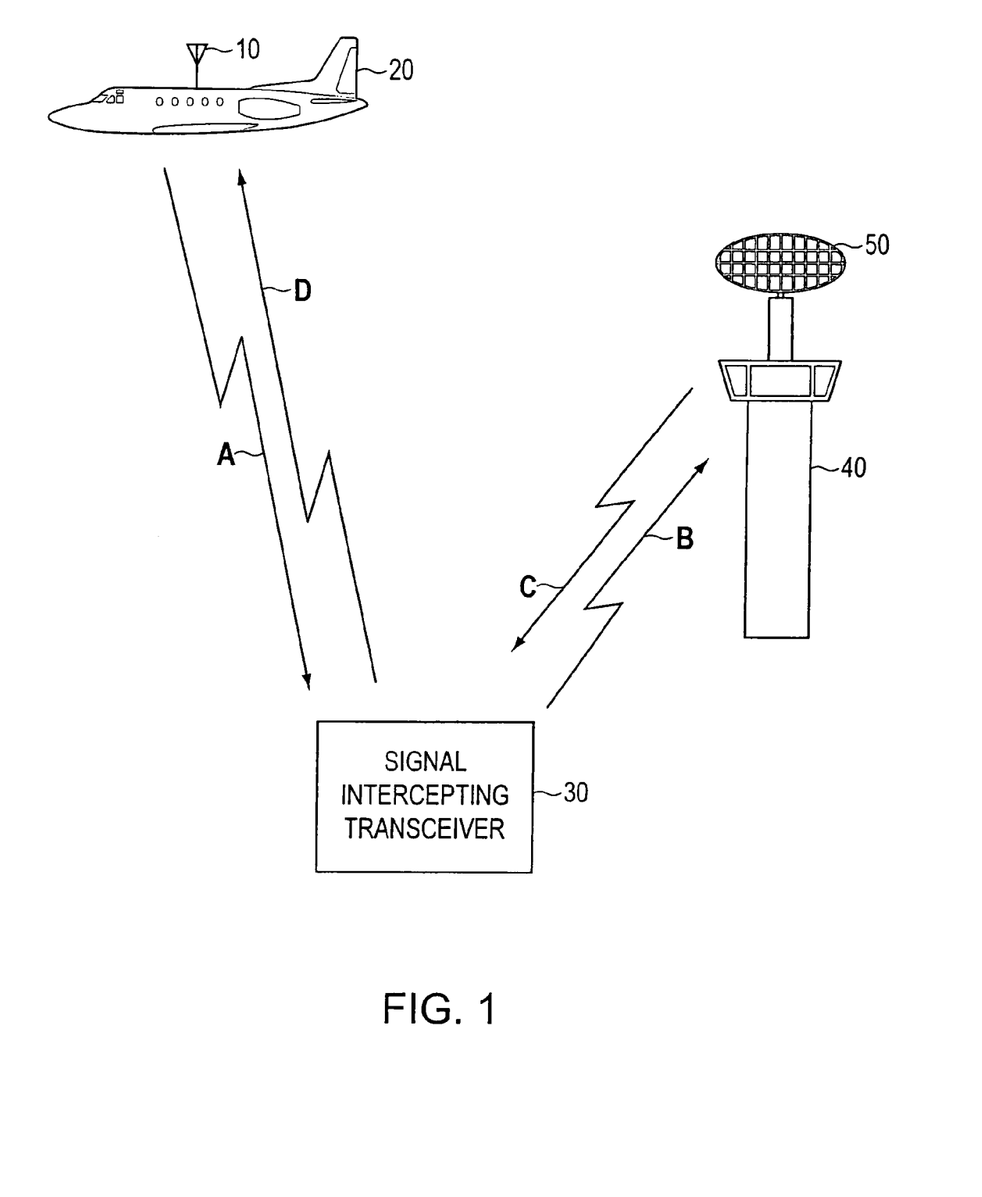
FIG. 1 schematically illustrates an exemplary embodiment of a system for facilitating communication between transceivers using different protocols.

FIG. 1 schematically illustrates an exemplary embodiment of a system for facilitating communication between transceivers using different protocols. A signal intercepting transceiver 30 may be configured to intercept a first transmission represented by the arrow A from a first transceiver 10. The first transceiver 10 is depicted in this exemplary embodiment as being located onboard an aircraft 20. The first transmission A may contain a first data content using a first protocol. The signal intercepting transceiver 30 may be configured with, and/or comprise, a protocol identifying device, to identify the first protocol of the intercepted transmission. Data content of the first transmission may include an identifier of, or associated with, the first transceiver 10 or the associated aircraft 20. The signal intercepting transceiver 30 may identify the first protocol in one or more of a variety of ways that will be described in greater detail below.

The signal intercepting transceiver 30 may also determine a protocol reception capability of a second transceiver 50 to which the first transmission A may have been directed. The signal intercepting transceiver 30 may convert the first data content of the first transmission to a second protocol based on an assessment of an identified protocol reception capability of the second transceiver 50.

The signal intercepting transceiver 30 may transmit the first data content to the second transceiver 50 using the second protocol, represented by arrow B.

The signal intercepting transceiver 30 may also intercept a second transmission represented by arrow C from the second transceiver 50 containing a second data content. The second transmission C may be intended for the first transceiver 10, but use the second protocol. The second transceiver 50 is represented in this exemplary embodiment as being located in an exemplary air traffic control operations center 40.

The signal intercepting transceiver 30 may further identify the second protocol and the protocol reception capability of the first transceiver 10, as discussed above.

The signal intercepting transceiver 30 may convert the second data content to the first protocol based on an assessment of the identified protocol reception capability of the first transceiver 10.

The signal intercepting transceiver 30 may transmit a signal represented by arrow D containing the second data content to the first transceiver using the first protocol.

In such a manner, the signal intercepting transceiver 30 may facilitate communication between a first transceiver 10 and a second transceiver 50, the first and second transceivers 10, 50 using different data protocols. It should be appreciated that although the first and second transmissions represented by arrows A and C, respectively, are shown as pointed to the signal intercepting transceiver 30, such transmissions are not required to, and likely will not, be directed to the signal intercepting transceiver 30. Disclosed embodiments contemplate transmissions between a first transceiver 10 and a second transceiver 50 in a manner that may not require either of users of the first or second transceiver to appreciate the role of, or even the presence of, the signal intercepting transceiver 30. As such, first transmission A may be communicated to second transceiver 50, second transceiver 50 receiving signal B with, or without, indicia of the presence of, or conversion performed by, signal intercepting transceiver 30. Likewise, second transmission C may be communicated to first transceiver 10 by signal D with, or without, indicia of the presence of, or conversion performed by, signal intercepting transceiver 30.

Figure 2:
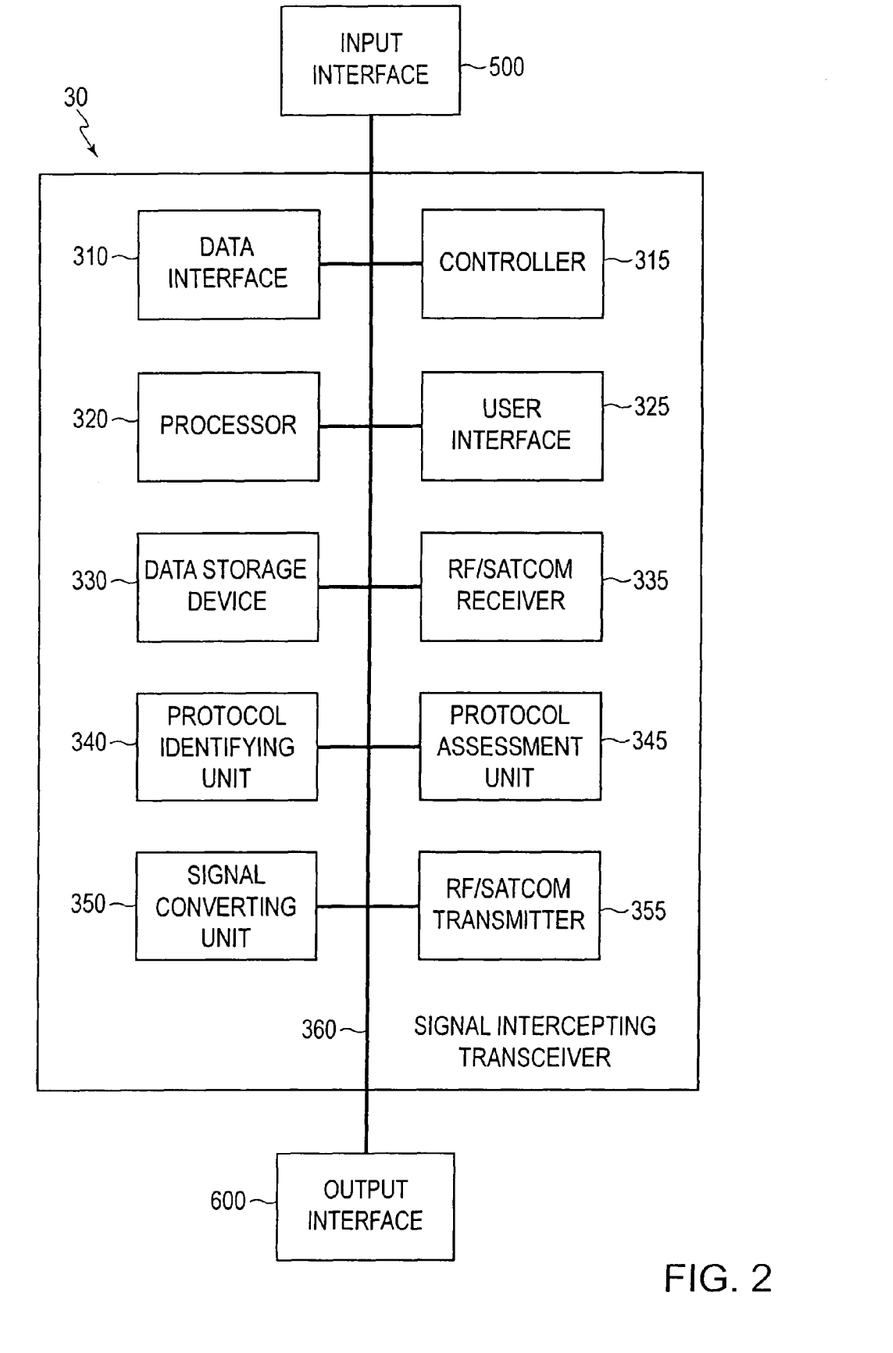
FIG. 2 is a schematic block diagram illustrating an exemplary system incorporating a signal intercepting transceiver to facilitate communication between transceivers using different protocols.

FIG. 2 is a schematic block diagram illustrating an exemplary system incorporating a signal intercepting transceiver 30 to facilitate communication between transceivers using different protocols. As shown in FIG. 2, an exemplary signal intercepting transceiver 30 may include a data interface 310, a controller 315, a processor 320, a user interface 325, at least one data storage device 330, an RF/SATCOM receiver 335, a protocol identifying unit 340, a protocol assessment unit 345, a signal converting unit 350, and an RF/SATCOM transmitter 355, all connected by a data/control bus 360. The signal intercepting transceiver 30 may include at least the protocol identifying unit 340 that is configured to identify, for example, at least one of a first protocol, a protocol reception capability of a second transceiver, a second protocol, and/or a protocol reception capability of the first transceiver 10.

The signal intercepting transceiver 30 may receive a variety of signals directly via one or more receivers operatively connected to the signal intercepting transceiver 30 via, for example, the input interface 500 and the data/control bus 360. Such signals may also be communicated directly to the signal intercepting transceiver 30 via a receiver 335 that may be configured to receive at least one of RF communications between transceivers and/or satellite communications (SATCOM) transmissions between multiple transceivers. Communications reception and/or interception undertaken by the signal intercepting transceiver is envisioned to encompass any manner of currently known communication devices that communicate, for example, electronic, electro-optical, optical, voice, image, or other data via wired or wireless means.

The protocol assessment unit 345 may then assess the compatibility of any received signal with a reception capability of at least another transceiver to which the received/intercepted signal was directed. When such an assessment reveals that the protocol of the intercepted signal is not compatible with a reception capability of the intended receiving transceiver, as determined in the protocol assessment unit 345, a signal converting unit 350 may be provided to convert, for example, a data content of the received/intercepted transmission to a second protocol based on the assessment of the identified protocol reception capability of the second transceiver.

Such conversion may include identifying specific elements of the data content that are compatible with the second protocol and converting only those elements to the second protocol.

A data storage device 330 may store an identifier, and/or information, associated with at least one transceiver. The protocol identifying device 340 may identify the transmission and/or reception capability one or more transceivers based on stored identifying information associated with the respective transceiver.

It should be appreciated that the signal converting unit 350 may automatically convert first data content to a second protocol and second data content to a first protocol, as graphically depicted in FIG. 1, based on an assessment of protocol transmission, and/or reception, capabilities of a transceiver. Embodiments may identify a transceiver based on at least one of a transmission protocol, a registered transceiver identifier, or a transmitted transceiver identifier. For example, after an initial assessment is made regarding a transceiver by the protocol assessment unit 345, a transceiver may be identified such that subsequent transmissions to or from that transceiver are automatically converted without further assessment of reception and/or transmission capabilities of that transceiver, or a second transceiver. Additional exemplary methods of such processing are discussed further below.

The signal intercepting transceiver 30 may further include a transmitter 355 capable of transmitting data content, respectively, via different protocols via one or more of a radio frequency (RF) or satellite communication (SATCOM) communication link to another transceiver. Such data content may also be concurrently, or otherwise, transmitted and/or received by external devices via output interface 600. Likewise, the output interface 600 may provide an alternate contact means to a second transceiver such as, for example, via a fiber optic link or the like. Such an embodiment may have the advantage of using alternate communication means that provide increased speed, reliability, or efficiency.

Any data storage contemplated for various exemplary embodiments of the disclosed system may be implemented using any appropriate combination of alterable memory or fixed memory. The alterable memory, whether volatile or non-volatile, may be implemented using any one or more of static or dynamic RAM, a miniaturized internal disk drive with associated disk-type medium, a hard drive, a flash memory or any other like memory medium and/or device. Similarly, fixed memory can be implemented using any one or more of ROM, PROM, EPROM, EEPROM, or compatible internal disk drive, or any other like memory storage medium and/or device.

It should be appreciated that given the required inputs, the identifying, assessing, and converting outlined above to be undertaken in exemplary manner by the protocol identifying device 100, assessment device 150 and signal converting unit 200, may be implemented through software algorithms, hardware or firmware circuits, or any combination of software, hardware, and/or firmware control and/or processing elements.

It should be further appreciated that, although depicted as a system and/or set of subsystems internal to the exemplary signal intercepting transceiver 30, the above-described functionalities for at least communication reception, protocol identification, protocol assessment, signal conversion and/or signal transmission may occur with the applicable systems not being internal to and/or in any manner integral to the exemplary signal intercepting transceiver 30. Rather, each of the described functionalities of the protocol identifying unit 340 protocol, assessment unit 345 and signal converting unit 350 may be implemented as one or more external devices to the exemplary signal intercepting transceiver 30. It should be appreciated that each of the one or more devices and/or units, and the exemplary capabilities described as being associated with each of the one or more devices and/or units, may be implemented through any manner of data exchange and communication with the exemplary signal intercepting transceiver 30.

It should be appreciated that although depicted as separate individual elements, any of the depicted individual units and/or devices may be combinable with other individual units and/or devices as combined units and/or devices within the exemplary signal intercepting transceiver 30. Further, while envisioned as a hard-wired data/control bus 360, any data communication path by which data and control inputs may be exchanged between individual units and/or devices, and/or combination units and/or devices, within the exemplary signal intercepting transceiver 30 is envisioned. Such data communications paths may include individual wired and/or wireless and/or optical communications connections, or any combination of such connections between communicating elements. Additionally, one or more of the depicted individual elements and/or combination units or devices, as discussed above, may be located external to, and otherwise in data communication with, the exemplary signal intercepting transceiver 30.

Figure 3:
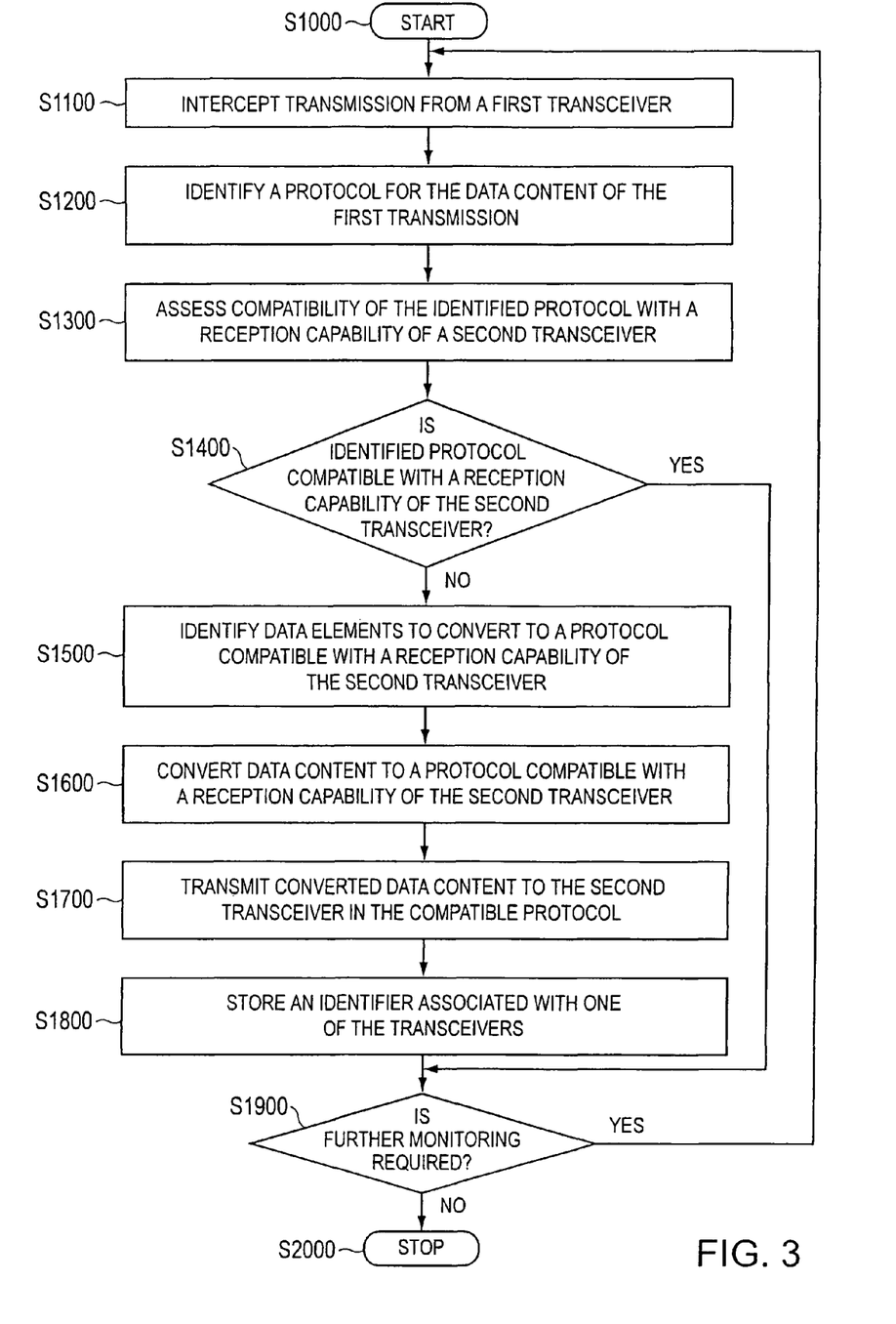
FIG. 3 is a flowchart illustrating a first exemplary method for facilitating communication between transceivers using different protocols.

FIG. 3 is a flowchart illustrating a first exemplary method for facilitating communication between transceivers using different protocols.

Operation of the method commences at step S1000 and continues to step S1100 where a transmission from a first transceiver may be intercepted. The transmission may contain a data content using a specified protocol. Operation of the method continues to step S1200.

In step S1200, a protocol associated with the intercepted transmission may be identified and optimally classified as a first protocol. Operation of the method continues to step S1300.

In step S1300, an assessment is made of the compatibility of the identified protocol with a reception capability of a second transceiver. It should be appreciated that the reception capability of the second transceiver may be evaluated based on at least one of a stored identifier or stored information regarding the second transceiver, or information transmitted from the second receiver autonomously or in response to a querying transmission from, for example, a signal intercepting transceiver, as discussed above. Operation of the method continues to step S1400.

In step S1400, a determination is made whether the first protocol is compatible with the second transceiver, i.e. a reception capability of the second transceiver, for receiving the transmission.

If, in step S1400, a determination is made that the first protocol is compatible with the second transceiver, no further action is required and operation of the method proceeds directly to step S1900.

If, in step S1400, a determination is made that the first protocol is not compatible with the second transceiver, operation of the method continues to step S1500.

In step S1500, elements of the data content of the intercepted transmission, which are compatible with a second protocol associated with the second transceiver, may be identified. Operation of the method continues to step S1600.

In step S1600, data content of the intercepted transmission may be converted to a second protocol compatible with the second transceiver. This may include converting only those elements of the data content that are identified as compatible with the second protocol in step S1500. Operation of the method continues to step S1700.

In step S1700, the data content may be transmitted to the second transceiver using the second protocol. Such transmission may be via similar or dissimilar carrier to the intercepted transmission. Operation of the method continues to step S1800.

In step S1800, an identifier may be stored in association with either transceiver for later use in identifying the respective transceiver. Operation of the method proceeds to step S1800.

In step S1900, a determination is made whether further monitoring may be required.

If in step S1900, a determination is made that such processing should continue, operation of the method reverts to step S1100 where further transmissions from one or more first transceivers may be intercepted.

If in step S1900, a determination is made that no further processing is necessary, operation of the method continues to step S2000 where operation of the method ceases.

Figure 4:
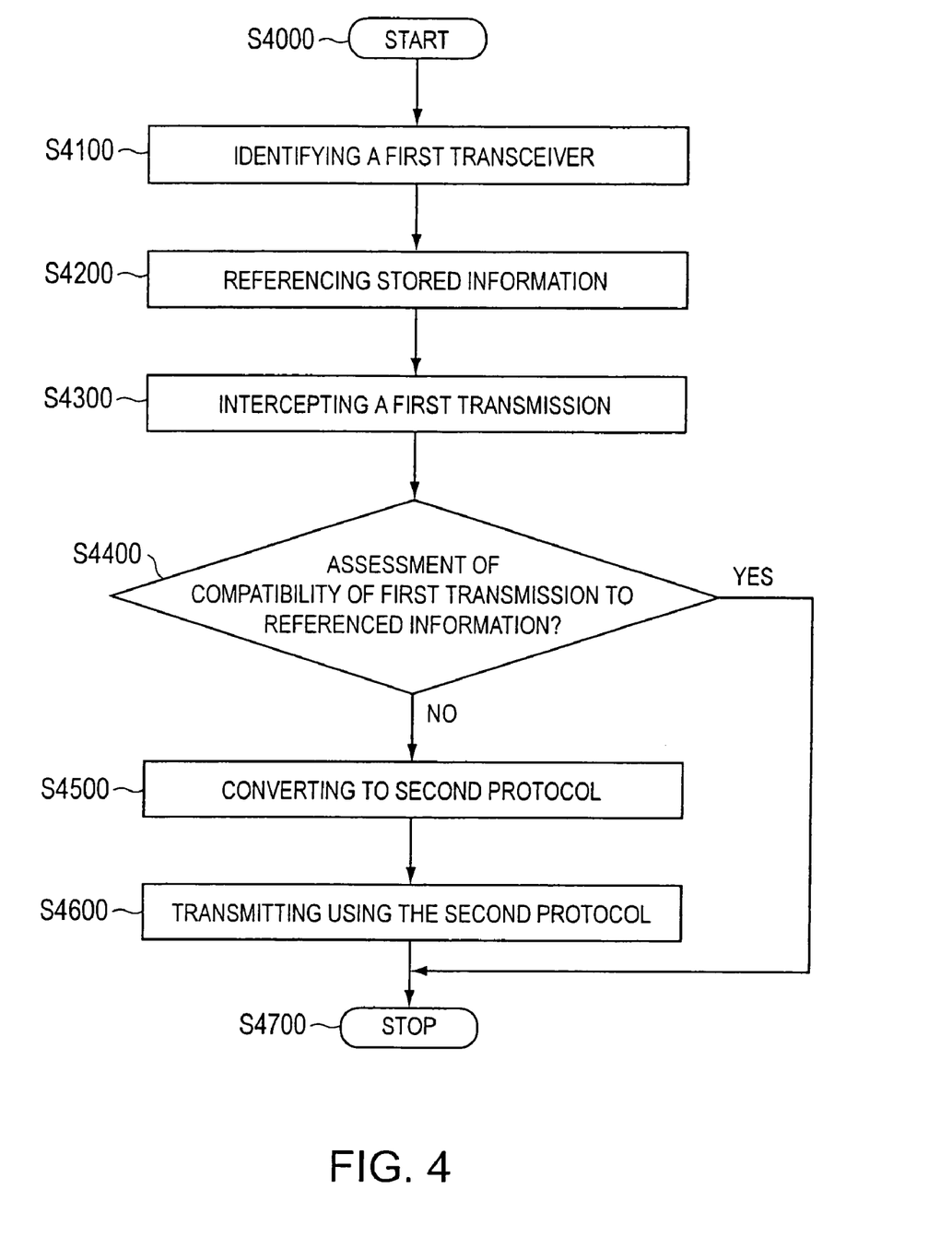
FIG. 4 is a flowchart illustrating a second exemplary method for facilitating communication between transceivers using different protocols.

FIG. 4 is a flowchart illustrating a second exemplary method for facilitating communication between transceivers using different protocols.

It should be appreciated that although the method depicted in FIG. 4 may differ from the method depicted in FIG. 3, such methods may be conducted concurrently or independently by individual or similar disclosed systems.

Operation of the second exemplary method commences at step S4000 and continues to step S4100.

In step S4100, a first transceiver may be identified based on at least one of a transmission protocol, a registered transceiver identifier, or a received transceiver identifier. Identifying a transceiver based on a transmission protocol may include, for example, identifying a transceiver based on a detected, or otherwise identified, transmission from the transceiver using a legacy protocol that may benefit from conversion to a more recent, or other, protocols such as ARINC 620 to ARINC 623. Identifying a transceiver based on a registered transceiver identifier may include, for example, referencing a detected, or otherwise identified, transceiver identifier such as, for example, identification information within a detected transmission received from the transceiver, against registration data for authorized users of an exemplary system as is disclosed above. Identifying a transceiver based on a received transceiver identifier may include, for example, identifying a transceiver based on identification information contained in a detected signal such as, for example, a unique aircraft callsign incorporated in a signal transmitted to or from an aircraft. Operation of the method continues to step S4200.

In step S4200, information regarding communication capabilities of the first transceiver may be referenced. It should be appreciated that depending on various factors including, for example, the means of acquiring the reference information, step S4200 may be repeated, or conducted for a first time, after step S4300. Operation of the method continues to step S4300.

In step S4300, a transmission may be intercepted from the first transceiver. The transmission may contain a data content using a first protocol. Operation of the method continues to step S4400.

In step S4400, an assessment of the referenced information may be conducted. Such assessment may include identifying a transmission and/or reception capability of the first transceiver or a second transceiver. Such assessment may also simply be a determination that the first transceiver is identified as a user of an exemplary system for facilitating communication between systems using different protocols. It should be appreciated that these examples are not limited to any certain types of information that may be assessed, or types of assessments that may be conducted based on such information, in step S4400.

If, in step S4400, the assessment indicates that conversion is not required, no further action is required and operation of the method proceeds to step S4700 where operation of the method ceases. It should be appreciated that as used herein "not required" may include instances where conversion would be necessary but not appropriate for other reasons such as, for example, when the transceiver is not a registered user of the intermediate system.

If, in step S4400, the assessment indicates that conversion is required, operation of the method continues to step S4500.

In step S4500, data content of the transmission may be converted to a second protocol. Operation of the method may continue to step S4600.

In step S4600, the data content may be transmitted using the second protocol. Operation of the method continues to step S4700 where operation of the method ceases.

As indicated previously, it should be appreciated that the second exemplary method may be performed in conjunction with aspects of the first exemplary method such as, for example, after assessing a transmission from a first transceiver, that transceiver may be considered as "identified" in accordance with the second exemplary method, and dealt with accordingly.

While exemplary embodiments have been described above for the disclosed systems and methods, the exemplary embodiments and variations thereof should be viewed as illustrative, and not limiting. Various modifications, substitutes, or the like may be possible to implement the systems and methods according to this disclosure, and such variations are reasonably contemplated by reference to the above discussed exemplary embodiments.

What is claimed is:

1. A method for communicating data content using different protocols, comprising:
   intercepting a first transmission from a first transceiver directed to a second transceiver containing a first data content, the first transmission using a first protocol, and at an interrupting transceiver,
   identifying the first protocol;
   assessing whether the first protocol is compatible with the second transceiver for receiving the first transmission;
   converting the first data content to a second protocol based on an assessment that the first protocol is not compatible with the second transceiver; and
   transmitting the first data content to the second transceiver using the second protocol,
   wherein converting the first data content to the second protocol comprises identifying specific elements of the first data content that are compatible with the second protocol and converting only those elements to the second protocol.

2. The method of claim 1, further comprising:
   storing an identifier associated with the first transceiver;
   intercepting a second transmission from the second transceiver containing a second data content, the second transmission intended for the first transceiver and using the second protocol;
   identifying the second protocol;
   assessing whether the second protocol is compatible with the first transceiver;
   converting the second data content to the first protocol based on an assessment that the second protocol is not compatible with the first transceiver; and
   transmitting the second data content to the first transceiver using the first protocol.

3. The method of claim 1, wherein at least one of the first or second protocols is one of ARINC 620 or ARINC 623.

4. The method of claim 1, wherein at least one of the first transceiver or the second transceiver is onboard an aircraft.

5. The method of claim 1, wherein at least one of the first transceiver or the second transceiver is in an air traffic control operations center.

6. The method of claim 2, wherein:
   converting the second data content to the first protocol comprises identifying specific elements of the second data content that are compatible with the first protocol and converting only those elements to the first protocol.

7. The method of claim 2, wherein at least one of the first or second data content comprises oceanic clearance delivery information.

8. A method for facilitating communication of data between transceivers using different protocols, comprising:
   identifying a first transceiver based on at least one of a transmission protocol, a registered transceiver identifier, or a received transceiver identifier;
   referencing information regarding communications capabilities of the first transceiver or a second transceiver;
   intercepting a first transmission from the first transceiver or the second transceiver containing a first data content and using a first protocol directed to the other of the first transceiver or second transceiver at an intercepting transceiver;
   automatically converting the first data content to a second protocol based on an assessment of the referenced information; and
   transmitting the first data content using the second protocol,
   wherein automatically converting the first data content to the second protocol comprises identifying specific elements of the first data content that are compatible with the second protocol and converting only those elements to the second protocol.

9. The method of claim 8, wherein at least one of the first transceiver or the second transceiver is onboard an aircraft.

10. The method of claim 8, wherein at least one of the first transceiver or the second transceiver is in an air traffic control operations center.

11. The method of claim 8, wherein identifying the first transceiver further comprises validating a user based on the at least one of a transmission protocol, a registered transceiver identifier, or a transmitted transceiver identifier.

12. The method of claim 8, wherein at least one of the first or second protocols is one of ARINC 620 or ARINC 623.

13. The method of claim 2, wherein the first data content comprises oceanic clearance delivery information.

14. A signal intercepting transceiver system for converting transmissions using different protocols, comprising:
- a receiver that intercepts at least a first transmission from a first transceiver containing a first data content using a first protocol directed to a second transceiver;
- a protocol identifying device that identifies the first protocol;
- an assessment unit that assesses a protocol reception capability of the second transceiver;
- a signal converting unit that converts the first data content to a second protocol based on the assessment; and
- a transmitter that transmits the first data content to the second transceiver using the second protocol,
- wherein the signal converting unit identifies specific elements of the first data content that are compatible with the second protocol and converts only those elements to the second protocol.

15. The system of claim 14, wherein:
- the receiver intercepts a second transmission from the second transceiver containing a second data content, the second transmission intended for the first transceiver and using the second protocol,
- the protocol identifying device further identifies the second protocol and a protocol reception capability of the first transceiver,
- the signal converting unit further converts the second data content to the first protocol based on an assessment of the identified protocol reception capability of the first transceiver; and
- the transmitter further transmits the second data content to the first transceiver using the first protocol.

16. The system of claim 14, wherein at least one of the first and second protocols is one of ARINC 620 or ARINC 623.

17. The system of claim 14, wherein at least one of the first transceiver or the second transceiver is onboard an aircraft.

18. The system of claim 14, wherein at least one of the first transceiver or the second transceiver is in an air traffic control operations center.

19. The system of claim 15, wherein:
- converting the second data content to the first protocol comprises identifying specific elements of the second data content that are compatible with the first protocol and converting only those elements to the first protocol.

20. The system of claim 14, further comprising a data storage device that stores at least one of an identifier of or an information associated with, at least one of the first transceiver or the second transceiver,
- wherein the protocol identifying device identifies at least one of the reception capability of the first transceiver or the reception capability of the second transceiver based on the associated identifier and information.

21. The system of claim 15, wherein at least one of the first and second data content comprises oceanic clearance delivery information.

22. A system for facilitating communication between transceivers using different protocols, comprising:
- a protocol identification device, that identifies a first transceiver based on at least one of a transmission protocol, a registered transceiver identifier, or a received transceiver identifier;
- a signal intercepting transceiver that intercepts at least a first transmission from the first transceiver or a second transceiver containing a first data content using a first protocol directed to the other of the first transceiver or second transceiver,
- an assessment device that assesses protocol transmission or reception capability of the first transceiver or the second transceiver;
- a signal converting unit that automatically converts the first data content to the second protocol based on the assessment of the protocol transmission, or reception, capability of the first transceiver or the second transceiver; and
- a transmitter that transmits the first data content using the second protocol,
- wherein the first data content is communicated to a transceiver system using the second protocol, and
- the signal converting unit identifies specific elements of the first data content that are compatible with the second protocol and converts only those elements to the second protocol.

23. The system of claim 22, wherein at least one of the first and second protocols one of ARINC 620 or ARINC 623.

24. The system of claim 22, wherein at least one of the first transceiver or the second transceiver is onboard at least one aircraft.

25. The system of claim 22, wherein at least one of the first transceiver or the second transceiver is in an air traffic control operations center.

26. The system of claim 22, further comprising a data storage device that stores an identifier, and information, associated with at least one of the first transceiver or the second transceiver;
- wherein, the protocol identifying device identifies at least one of the reception capability of the first transceiver or the reception capability of the second transceiver based on the associated identifier and information.

27. The system of claim 22, wherein the first data content comprises oceanic clearance delivery information.

\* \* \* \* \*